United States Patent
Krumpholz

(10) Patent No.: US 10,700,515 B2
(45) Date of Patent: Jun. 30, 2020

(54) POWER SUPPLY WITH SURGE VOLTAGE PROTECTION

(71) Applicant: DET International Holding Limited, Grand Cayman (KY)

(72) Inventor: Christian Krumpholz, Freiburg (DE)

(73) Assignee: DELTA ELECTRONICS (THAILAND) PUBLIC CO., LTD., Samutprakarn (TH)

(*) Notice: Subject to any disclaimer, the term of this patent is extended or adjusted under 35 U.S.C. 154(b) by 120 days.

(21) Appl. No.: 14/854,802

(22) Filed: Sep. 15, 2015

(65) Prior Publication Data
US 2016/0087431 A1   Mar. 24, 2016

(30) Foreign Application Priority Data

Sep. 18, 2014  (EP) ..................... 14405070

(51) Int. Cl.
*H02H 9/00* (2006.01)
*H02H 9/04* (2006.01)
*H02H 3/20* (2006.01)
*H02H 3/02* (2006.01)

(52) U.S. Cl.
CPC ............ *H02H 9/005* (2013.01); *H02H 3/023* (2013.01); *H02H 3/20* (2013.01); *H02H 9/041* (2013.01); *H02H 3/202* (2013.01); *H02H 9/04* (2013.01); *H02H 9/042* (2013.01); *H02H 9/046* (2013.01)

(58) Field of Classification Search
USPC ............................................ 361/86–87, 91.1
See application file for complete search history.

(56) References Cited

U.S. PATENT DOCUMENTS

| | | | |
|---|---|---|---|
| 4,912,589 A | | 3/1990 | Stolarczyk |
| 5,157,574 A | * | 10/1992 | Tuusa .................. H02M 5/4585 |
| | | | 361/18 |
| 5,333,105 A | * | 7/1994 | Fortune .................. H02H 9/041 |
| | | | 361/111 |
| 6,118,639 A | | 9/2000 | Goldstein |

(Continued)

OTHER PUBLICATIONS

European Patent Office Search Report, dated Mar. 6, 2015, 6 pages, Application No. EP 14405070.5.

(Continued)

*Primary Examiner* — Danny Nguyen
(74) *Attorney, Agent, or Firm* — Vector IP Law Group LLC; Robert S. Babayi

(57) ABSTRACT

The invention relates to a surge protected power supply for feeding a device with electrical energy. The power supply includes a surge protection device SPD connected in series with a controllable switch where this series connection is connected between two current conductors of the power supply. The power supply further includes a device for determining a comparison voltage such that the comparison voltage is in some form indicative of a surge voltage present at the input of the power supply. This comparison voltage then is compared to a threshold. If the comparison voltage is higher than the threshold, the controllable switch is closed such that the SPD in series with the switch is effectively connected between the two current conductors to divert the surge current through the SPD. If the comparison voltage is lower than the threshold the switch remains open.

17 Claims, 4 Drawing Sheets

(56) References Cited

U.S. PATENT DOCUMENTS

| | | | |
|---|---|---|---|
| 6,226,162 B1 | 5/2001 | Kladar et al. | |
| 7,430,101 B2 * | 9/2008 | Komulainen | H02M 5/458 |
| | | | 361/111 |
| 7,940,506 B2 | 5/2011 | Lewis | |
| 8,345,400 B2 | 1/2013 | Veskovic | |
| 8,929,042 B2 * | 1/2015 | Pfitzer | H02H 9/041 |
| | | | 361/91.1 |
| 2002/0118554 A1 * | 8/2002 | Watanabe | H02M 7/217 |
| | | | 363/39 |
| 2002/0159212 A1 | 10/2002 | Oughton, Jr. | |
| 2006/0034109 A1 * | 2/2006 | Benabdelaziz | H02M 7/12 |
| | | | 363/125 |
| 2011/0026182 A1 | 2/2011 | Buchanan et al. | |
| 2013/0077201 A1 * | 3/2013 | Sagona | H02H 9/041 |
| | | | 361/91.1 |
| 2014/0254057 A1 | 9/2014 | Chen et al. | |

OTHER PUBLICATIONS

European Patent Office Search Report, dated Nov. 27, 2018, 4 pages.

\* cited by examiner

POWER SUPPLY WITH SURGE VOLTAGE PROTECTION

TECHNICAL FIELD

The invention relates to a power supply for feeding a device with electrical power, including a surge voltage protection arrangement with a surge protection device connected between the two current conductors. The invention further relates to an electrically operable device including such a power supply and a corresponding method for protecting a power supply for feeding a device with electrical power against a surge voltage.

BACKGROUND ART

In a supply network for supplying electrical power to electrical devices, line surge voltages may occur. In the following, such a supply network is also designated as a grid. Such line surge voltages are for example caused by a sudden release of energy that was previously stored in an energy storage device or where energy has been induced into the grid by other means, such as for example by inductive loads or lightning strikes. A line surge voltage typically occurs as a voltage pulse with a sharp rising edge and a comparably slow decay. In a 220 V AC grid for example a typical surge pulse has a level of above 1000 V. In an AC grid surges may occur between a phase line and the neutral line or between two phase lines. Such surges are known as symmetrical surges. If a surge occurs between a phase line and the protective earth line, the surge is known as an asymmetrical surge.

As such surge pulses may affect the function of the electrical devices connected to the grid or even damage or destroy them, the power supply of an electrical device usually is protected against such line surge voltages.

Protection against surge voltages can for example be achieved by connecting a protective component in series to the load in order to suppress the surges. This type of protective component for example includes: "Quarter-wave coaxial surge arrestor" and "Series Mode (SM) surge suppressor". Another way to protect against surges is to connect a protective component in parallel to the load such that the overvoltage is diverted away from the load through the protective component. Examples for such components include: Metal oxide varistor (MOV), Transient voltage suppression (TVS) diode, Thyristor surge protection device (TSPD), Gas discharge tube (GDT), Selenium voltage suppressor or Carbon block spark gap overvoltage suppressor.

Generally such protective components are called SPDs (surge protection device) and they may also be combined to enhance the protection.

Which or which combination of SPDs is best suited in a particular application depends on the circumstances and the specification of the application and may be chosen accordingly.

In a low voltage AC grid such as an industrial, commercial or household electrical distribution system providing a one or multiphase AC supply network MOVs are the most widely used type of SPD, because they are low cost and effective. Such AC supply networks typically have a phase-to-neutral voltage of about 100 V to 300 V.

Document U.S. Pat. No. 8,345,400 B2 (Lutron Electronics) discloses such a surge suppression circuit having an MOV 222 connected in parallel between the phase and the neutral line to clamp the magnitude of a surge voltage to a predefined level.

Document U.S. Pat. No. 7,940,506 B2 (Dollar Energy Group) discloses another surge suppression apparatus. Again, MOVs are connected in parallel between the neutral and phase lines where the power supply is connected to the grid. Additional surge sense devices 106, 106' such as fuses or thermal sensing devices are provided within the neutral and phase line to interrupt these lines if the current flowing through these lines becomes too high.

Document U.S. Pat. No. 6,118,639 (Goldstein) discloses a fast acting disconnect system with a transient voltage surge suppressor. The system includes a capacitor which, in case of an overvoltage, is charged by a charging circuit that uses the energy of the overvoltage to charge the capacitor. If the capacitor voltage reaches a predetermined level the energy stored in the capacitor is used to operate a disconnect switch for disconnecting the device from the grid. Accordingly, the whole device is disconnected wherefore the load cannot be operated any more.

Arranging an SPD such as for example a MOV in parallel to the load is an easy to implement solution. However, when choosing for example a varistor for a particular application, its voltage value is usually determined as about 25% higher than the maximum nominal operating voltage of the device to be protected. This is done to avoid that the SPD is activated in cases where this is not necessary. Accordingly, depending on the surge current the supply voltage is clamped by the SPD at a comparably high level. The level of this clamp voltage may be too high for the downstream circuit such that the downstream circuit may be damaged.

SUMMARY OF THE INVENTION

It is the object of the invention to create a power supply pertaining to the technical field initially mentioned, that enables to effectively protect the power supply itself as well as the devices connected thereto against surge voltages and thereby to reduce the risk of damage of the power supply or the supplied devices. It is another object of the invention to create an electrically operable device including such a power supply and it is a further object of the invention to provide a corresponding method for protecting a power supply against a surge voltage.

The solution of the invention is specified by the features of claim 1. A power supply for feeding a device with electrical power includes a surge voltage protection arrangement for protecting the device against a surge voltage. The power supply is connected to a supply network and converts the input power into an output power that is suited to feed the device. The surge voltage protection arrangement includes a surge protection device that is connected between two current conductors of the power supply, i. e. in parallel to the load/device fed by the power supply.

According to the invention the voltage protection arrangement further includes a device for determining a comparison voltage, a controllable switch and a switch control where the switch is connected in series with the surge protection device. I. e. the serial connection of the switch and the surge protection device is connected in parallel to the load/device. The device for determining a comparison voltage serves for determining a comparison voltage such that the comparison voltage is in some form indicative of a surge voltage present at the input of the power supply. The switch control includes a comparison device for performing a comparison of the comparison voltage with a threshold. Further, the switch control is adapted to control a switching of the switch in dependency of a result of the comparison such that the switch is switched on if the comparison voltage is higher than the threshold.

Or in other words, no current is flowing through the SPD connected between the two current conductors in the normal mode of operation, i. e. when the comparison voltage does not exceed the threshold, because the switch is open. Only if the determined comparison voltage is higher than the threshold, the switch is closed and the SPD is actually connected between the two current conductors such that a current may flow through the SPD. Therefore the SPD only influences the operation of the device in the case of a surge but does not influence its operation in any way in normal operation mode of the device.

This means that the SPD may be dimensioned more freely. Its voltage value does not have to be chosen 25% higher than the maximal nominal operating voltage of the device but can be chosen in any way to best fulfilling the requirements of the particular application. It can therefore also be chosen to be lower than 125% of the maximal nominal operating voltage without activating the SPD where this is not necessary. And the lower the voltage value of the SPD, the lower the clamp voltage which more effectively protects the downstream circuit.

Furthermore, even in the case of a surge, the load can still be operated unlike in the case of the document U.S. Pat. No. 6,118,639 mentioned above.

In a preferred embodiment of the invention, the SPD is chosen such that the effective clamp voltage is lower than the maximal nominal operating voltage of the device to be protected. Or to be a bit more precise: such that the effective clamp voltage is lower than the maximal nominal operating voltage of those parts of the device that are located downstream of the SPD.

Furthermore, the whole circuit may be designed more efficiently because no current is flowing through the SPD and therefore less power is wasted during normal operation of the device.

Depending on the particular application each SPD that is connected in parallel to the load may be used to implement the invention. As mentioned above, these include for example a varistor, a suppression diode, a thyristor device, a gas discharge tube, a selenium suppressor or a carbon block suppressor. Varistors are preferably used to implement the invention because such varistors, particularly MOVs are easy to implement, widely available and exist in many different embodiments that allow to best fit them to an application.

The device for determining a comparison voltage determines the comparison voltage preferably by sensing the voltage directly across the serial circuit of the SPD and the switch, i. e. between the two current conductors between which this serial circuit is connected. This serial circuit of the SPD and the switch is also designated as the SPD circuit later on. This means that the voltage sensed between those two current conductors is directly used as the comparison voltage. In this way, the determination of the comparison voltage can be implemented very easy and with a very low effort regarding number of elements and costs.

However, the comparison voltage may also be derived from the sensed voltage, for example by using a voltage divider or otherwise manipulating the sensed voltage such that the comparison voltage is representative of the sensed voltage. Or another voltage that is indicative of a surge voltage and that is sensed between two other conductors of the power supply may be used as the comparison voltage or the comparison voltage may be derived from such a voltage.

In another preferred embodiment, the comparison voltage is determined based on the rate of change of the current that flows in one of the current conductors. For this purpose the power supply includes a detection unit that detects the rate of change of the current flowing in at least one of the current conductors. Then, the comparison voltage is determined based on the detected rate of change, for example as a voltage proportional to the detected rate of change. Preferably, the comparison voltage is determined as being proportional to the detected rate of change, where the proportionality factor for example corresponds to an inductivity present in the respective current conductor.

As outlined above, the switch is turned on by the switch control when the comparison voltage exceeds the threshold. This means that the switch remains open as long as the comparison voltage is lower or equal to the threshold. The switch control can however also be built such that the switch is closed if the comparison voltage is equal to the threshold.

Once the switch has been closed, it has also to be turned off later on. Switching the switch off after it has been switched on can be done at different occasions. The switch can for example be switched off by the switch control simply if the surge voltage is finished, i. e. if the comparison voltage is no longer above the threshold. In another example, the switch may be switched off if a predetermined amount of time has lapsed since the switching on of the switch. Or the switch may be switched off if a predetermined amount of time has lapsed since the surge voltage is finished, i. e. since the comparison voltage no longer exceeds the threshold. The switch control is therefore preferably adapted to switch the switch off if one or more of these conditions are fulfilled.

The invention may be used in any type of power supply, i. e. in DC/DC, AC/DC, DC/AC or AC/AC power supplies. The invention may for example be employed in a power supply with a DC input. In this case the comparison voltage determined by the voltage detection device is for example the DC voltage between the positive and the negative line at the input of the power supply and the SPD circuit may also be connected between the positive and the negative line.

Since power distribution of medium and low voltage power usually is done with AC grids, the invention is however preferably employed in power supplies with an AC input.

In the case of a power supply with an AC input, the comparison voltage preferably is the AC voltage between two phase conductors or between a phase conductor and the neutral conductor of the power supply. The SPD circuit then is preferably connected between those two conductors that deliver the comparison voltage.

The invention may be employed irrespective of whether the output of the power supply is AC or DC. In a power supply with a DC input, the DC input power may be converted to an AC output or to a DC output with a different voltage. In the case of a DC output, the DC output voltage may be used as the comparison voltage where the SPD circuit may either be arranged between the DC output lines or also somewhere between two conductors at the input of the power supply.

And in a power supply with an AC input, the AC input power is usually converted to another output power which may be either a DC output or an AC output with a specific amplitude and/or phase characteristic. In both cases, the power supply usually includes a rectifier to produce a DC voltage which is then either outputted directly or further converted to another DC output voltage or an AC output voltage. Again, the comparison voltage may be an AC or a DC voltage either at the input or at the output of the power supply. And the SPD circuit may be connected between two AC or DC conductors either at the input or at the output of the power supply.

However, the comparison voltage may also be a voltage tapped from the power supply somewhere between the input and the output of the power supply. And the SPD circuit may also be arranged somewhere within the power supply.

In a preferred embodiment of the invention, where the power supply is adapted to be fed by an AC grid and therefore includes an AC input, the power supply preferably includes a rectifier. In this case the voltage detection device may determine the comparison voltage either upstream or downstream of the rectifier. I. e. depending on the type and structure of the power supply these two current conductors either are the neutral conductor and a phase conductor or two phase conductors upstream of the rectifier or the two current conductors are the DC output conductors downstream of the rectifier.

The rectifier may be any kind or type of rectifier such as for example a controlled or non-controlled rectifier, full or half wave rectifier, centre tapped or bridge rectifier. Since many applications, where the invention may be advantageously implemented, include bridge rectifiers, power supplies with bridge rectifiers are preferably used.

The SPD circuit may also be arranged either upstream or downstream of the rectifier. Preferably, it is however connected downstream of the rectifier which allows to select the SPD in any desired way. Downstream in this connection just means after the rectifier as seen from the grid.

In a further preferred embodiment of the invention, a capacitor is connected across the output of the rectifier. This capacitor mainly serves for smoothing the output voltage of the rectifier.

When connecting the SPD circuit downstream of the rectifier, it is preferably connected directly behind the rectifier, i. e. no other components are arranged between the rectifier and the SPD circuit, particularly no other components are arranged serially between the rectifier and the SPD circuit. In this case, the leakage inductivity between the SPD circuit and the rectifier is very low and the voltage can be clamped even more effectively.

As already described above, surge pulses usually have a sharp rising edge. Depending on the surge pulse, the power supply and the device to be protected the response time of the voltage detection device, the switch control and the switch may be sufficient to close the switch fast enough to effectively protect the circuits. However, in some cases, the response time of these elements may not be sufficient to close the switch fast enough. In order to avoid that an excessive current flows through the surge protection device at the beginning of a surge pulse the surge voltage protection arrangement preferably includes an inductivity that is arranged in one of the current conductors such that it is connected in series with the surge protection device. This means that the inductivity is arranged such that a surge current from the grid flowing through the surge protection device also flows through the inductivity. This inductivity therefore limits the current at the beginning of the pulse and therefore allows closing the switch in time. The inductivity is for example dimensioned such that the surge current is limited for the first microseconds of the pulse.

The inductivity may either be a discrete element such as an inductance, a choke or the like or it may also be a stray or leakage inductivity of an inductive element such as for example a common mode choke that is present in the power supply anyway. The surge voltage protection arrangement may also include an inductivity in each of the two current conductors between which the SPD circuit is connected. In this case, the inductivities may be coupled or uncoupled.

In case of a power supply with a rectifier, the inductivity may either be connected upstream or downstream of the rectifier. In a preferred embodiment of the invention, the inductivity is connected upstream of the rectifier.

Any device that is capable of controllably establishing and truncating an electrical connection between two terminals may be used as the controllable switch. Depending on the application, the controlled switch may for example be a mechanical switch. However, in many applications such switches have to be fast and reliably wherefore an electrically controllable switch is preferably used. This may for example be a relay but since most applications require a very fast response characteristic, a solid state switch such as a transistor or a thyristor is preferably used.

In a preferred embodiment of the invention, the switch includes an IGBT (insulated-gate bipolar transistor) because IGBTs can switch very fast and combine the highly efficient gate-drive characteristics (very low control current) of a field effect transistor with the high-current capability and the high block voltage of a bipolar transistor.

The emitter of the IGBT is connected to a first one of the current conductors and the collector of the IGBT is connected to the surge protection device where the other terminal of the surge protection device is connected to a second one of the current conductors.

The switch control of course has to be chosen depending on the choice of the switch. Accordingly, the switch control may be a manual control. More preferably, the switch control includes an electric or electronic circuit producing an appropriate control (or drive) signal that is outputted at the control output of the switch control which in turn is connected to the control input of the controllable switch. In the case of an IGBT as the switch, the control output of the switch control is connected to the gate of the IGBT.

The control signal usually is an electrical signal such as a current or voltage signal having specific characteristics in terms of for example amplitude or frequency. Voltage signals are usually used as control signals for such switches. Depending on the type of control input of the switch, other kinds of signals such may also be used to control the switching of the switch. In the case of an optically controllable switch, the control signal may for example be an optical signal.

In a power supply fed by an AC grid, the invention is applicable irrespective of whether the power supply includes just a single phase or multiple phase lines. If however the power supply includes two or more phase lines, an inductivity is preferably arranged in each of the phase conductors of the power supply such that the surge current is limited by at least one of these inductivities no matter through which of the phase lines it flows. Of course it would be possible to arrange an inductivity just in one or only a part of the phase lines or for example just in the neutral conductor, this would limit the surge current in those cases where the surge current flows through a conductor that includes an inductivity but it would not limit the surge current in those cases where none of the conductors through which the surge current flows includes an inductor.

If for example the power supply is a three phase power supply, an inductivity is preferably arranged in each of the three phase conductors of the power supply.

Further it is to note that the surge protection arrangement may be provided as a unit separate from the power supply and may be simply connected to the power supply as wished for a particular application. In this way an existing power supply may for example be refitted with such a surge protection arrangement to convert it to a power supply according to the invention. Or such a surge protection device may simply be inserted between a power grid and a power supply connected to the grid to achieve surge protection. Of course such a surge protection arrangement may also be arranged as a separate unit between the power supply and the load.

The solution of the invention regarding the electrically operable device is specified by the features of claim 14. Instead of providing a separate power supply and connecting the device to the power supply, a power supply according to the invention is integrated into the electrically operable device such that the electrically operable device includes a power supply as outlined above. Usually, the power supply is provided within the housing of the electrical device as a module that may for example be easily removed and inserted into the housing of the device such that it may be easily exchanged in case of a failure of the power supply. However, the circuits and elements of the power supply may also be integrated into a single unit with the circuits and elements of the device, for example on one or more printed circuit boards or the like. In this case, some of the components of the power supply may be part of the electrical device and/or vice versa.

The solution of the invention regarding the method for protecting the power supply against a surge voltage is specified by the features of claim 15. The method includes the step of connecting a surge protection device between two current conductors of the power supply. According to the invention, the method further includes the steps of connecting a controllable switch in series with the surge protection device, determining a comparison voltage with a voltage detection device, comparing the comparison voltage with a threshold and switching the switch on if the comparison voltage is higher than the threshold.

In preferred embodiments of the invention the method may as outlined above include one or more further steps such as for example choosing the surge protection device such that an effective clamping voltage of the surge protection device is lower than a maximal nominal operating voltage of the device;

determining the voltage between the two current conductors as the comparison voltage;

switching the switch off if at least one of the conditions "a predetermined amount of time has lapsed since switching on of the switch", "the comparison voltage is no longer above the threshold" and "a predetermined amount of time has lapsed since the comparison voltage is no longer above the threshold" is fulfilled;

in a power supply with a rectifier, connecting the series circuit of the surge protection device and the switch downstream of the rectifier or even directly behind the rectifier;

arranging an inductivity in one of the current conductors and in series with the surge protection device, in particular upstream of the rectifier or using an electrically controllable switch, preferably an IGBT in series with the surge protection device.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
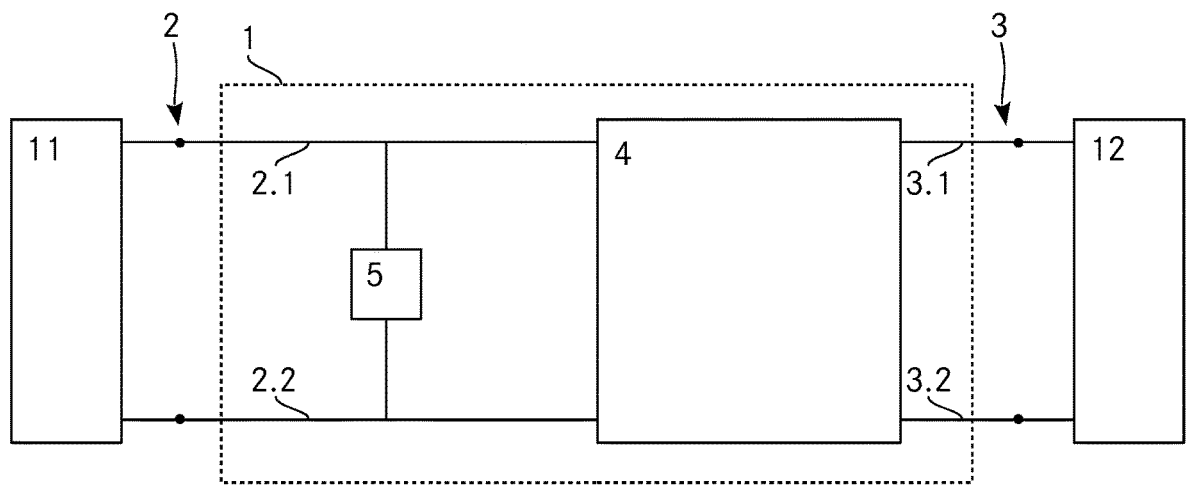
FIG. 1 a schematic illustration of a surge protected power supply according to the prior art.

FIG. 1 shows a surge protected power supply 1 according to the prior art. The power supply 1 includes an input 2, an output 3 and a power circuit 4 connected between the input 2 and the output 3. The input 2 is connected to a power grid 11 and a load 12 is connected to the output 3 of the power supply 1. The power supply 1 further includes a SPD 5 that is connected between the two input conductors 2.1 and 2.2. The load 12 is connected between two output conductors 3.1, 3.2 of the power supply.

The power grid 11 delivers AC power which may be provided with a single or multiple phase lines and usually a neutral as well as a protective line where the protective line usually is a protective earth line. Accordingly, the input 2 of the power supply 1 is adapted to receive AC power and includes a neutral conductor, a protective conductor and at least one phase conductor. In FIG. 1, the input 2 of the power supply 1 includes a phase conductor 2.1 and a neutral conductor 2.2. Depending on the applicable regulations and the load 12 the power supply 1 may also include a protective earth conductor at the input 2. The output 3 of the power supply 1 is shown to include two conductors which may either provide DC or AC power, dependent on the application, i. e. on the load 12 connected to it. In this case, the output 3 is a DC output where one of the conductors is a positive or high conductor 3.1 and the other is a negative or low conductor 3.2.

In order to protect the power supply 1 itself as well as the load 12 connected to in the case of a surge voltage, the power supply 1 includes a surge protection device SPD 5 connected at the input 2 between the phase conductor 2.1 and the neutral conductor 2.2. The SPD 5 may be any suitable surge protection device as known in the prior art and already mentioned. The SPD 5 is permanently connected between the two conductors such that it absorbs the excess energy in the case of a surge voltage by clamping the voltage between the two conductors to its clamp voltage.

Figure 2:
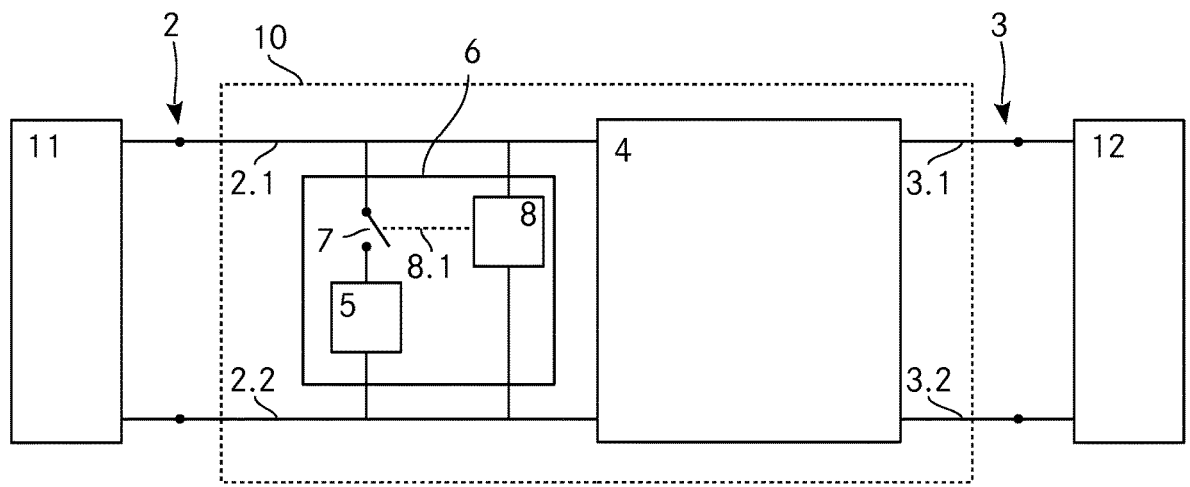
FIG. 2 a schematic illustration of a power supply according to the invention.
Figure 3:
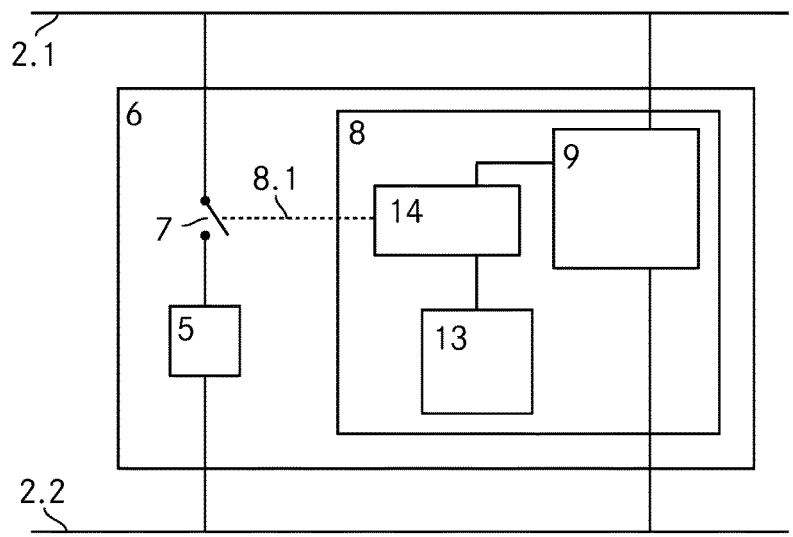
FIG. 3 a more detailed schematic illustration of the surge protection circuit shown in FIG. 2.

FIG. 2 shows a schematic illustration of a power supply 10 according to the invention. The power supply 10 is rather similar to the power supply 1 as shown in FIG. 1. Contrary to the power supply 1 the power supply 10 not only includes an SPD 5 connected directly between the phase conductor 2.1 and the neutral conductor 2.2, but it includes a surge protection circuit 6 (previously designated as surge protection arrangement) that is connected between the phase conductor 2.1 and the neutral conductor 2.2. The surge protection circuit 6 includes a serial circuit of a SPD 5 and a switch 7 where the serial circuit is connected between the phase conductor 2.1 and the neutral conductor 2.2 and where the switch 7 is a controllable switch. The surge protection circuit 6 further includes a control unit 8 to control the switching of the switch 7 which is illustrated by the dashed control line 8.1 from the control unit 8 to the control input of the switch 7. A more detailed illustration of the surge protection circuit 6 is shown in FIG. 3.

The control unit 8 includes a voltage sensor 9 for measuring the voltage between the phase conductor 2.1 and the neutral conductor 2.2. This voltage is designated as the comparison voltage. The control unit 8 further includes a threshold generator 13 and a switch control 14. The switch control 14 includes a comparator for comparing the comparison voltage with a threshold that is provided by the threshold generator 13. Based on this comparison, the switch control 14 generates the control signal that is outputted to the switch 7 via the control line 8.1.

As long as the comparison voltage is lower than the threshold, the switch control 14 controls the switch 7 such that it is open. This means that the SPD 5 is not connected to the phase conductor 2.1. In the case of a surge, the voltage between the phase conductor 2.1 and the neutral conductor 2.2 starts to rise. Accordingly, the comparison voltage increases as well. As soon as the comparison voltage is higher than the threshold, the switch control 14 controls the switch 7 such that it is closed. This means that the SPD 5 is connected to the phase conductor 2.1. Now the SPD 5 is dimensioned such that the voltage between the phase conductor 2.1 and the neutral conductor 2.2 is higher than the clamp voltage of the SPD 5 when the switch 7 is closed such that the surge current virtually immediately starts to flow through the SPD 5. In this way, the power supply 1 as well as the load 12 are effectively protected against the surge because the voltage between the phase conductor 2.1 and the neutral conductor 2.2 is limited to the clamp voltage of the SPD and therewith the current flowing through the load 12 is also limited.

Figure 4:
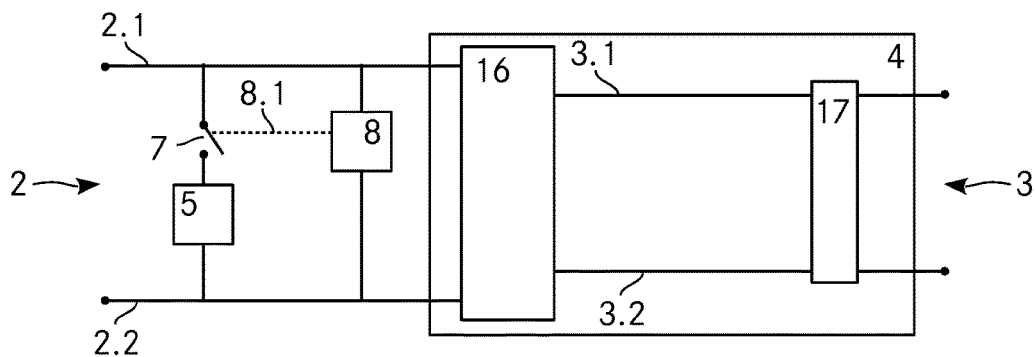
FIG. 4 a schematic illustration of another power supply according to the invention where the SPD and the voltage detection device are arranged at the input of the power supply.

The power supply shown in FIG. 4 is very similar to the one shown in FIG. 2. However, the power circuit 4 in this example is shown to include a rectifier 16. The output of the rectifier is a DC voltage provided by two output conductors 3.1, 3.2. Downstream of the rectifier 16 the power circuit may also include further circuits 17 such as a filter circuit, a PFC circuit, a DC/DC converter or other circuits. Such circuits 17 may include any circuit which needs protection.

A rectifier is often used in power supplies to convert an AC voltage to a DC voltage. The AC voltage often is the input voltage fed by a power grid. The rectified DC voltage may then either be outputted directly or it may be further processed such as filtered and the like before it is provided at the output of the power supply. The rectified DC voltage may also be converted to another DC voltage that is provided at the output. Or the rectified DC voltage may be inverted again to an AC voltage with a particular amplitude and frequency.

In the example shown in FIG. 4, the serial circuit of the SPD 5 and the controllable switch 7 is again connected at the input 2 of the power supply and the control unit 8 too is connected at the input 2 of the power supply. However, different configurations of the SPD circuit and the control unit are possible.

Figure 5:
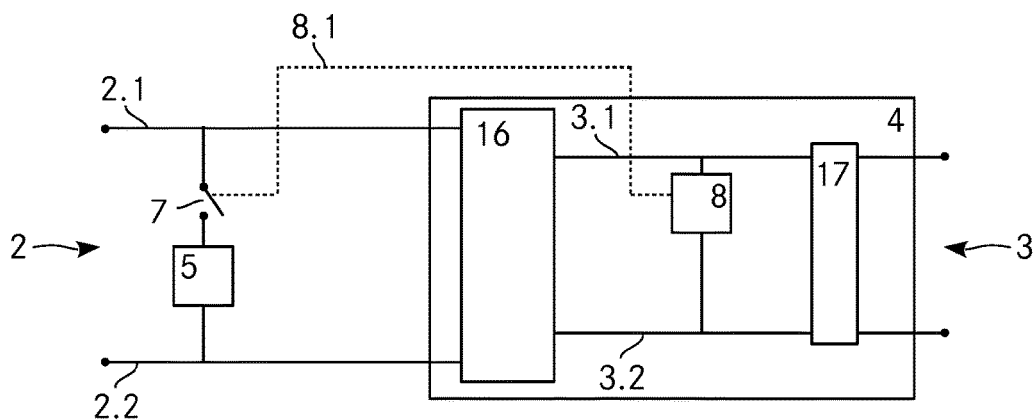
FIG. 5 a schematic illustration of another power supply according to the invention where the SPD is arranged at the input and where the voltage detection device is arranged behind the bridge rectifier.

FIG. 5 shows another configuration where the serial circuit of the SPD 5 and the switch 7 is connected upstream of the rectifier 16 but where the control unit 8 is connected downstream of the rectifier 16. I. e. the serial circuit of the SPD 5 and the switch 7 is connected between the two input conductors 2.1 and 2.2. And the control unit 8 is connected directly behind the rectifier 16 between the two output conductors 3.1. The control output of the control unit 8 is fed to the control input of the switch 7 by the control line 8.1 as previously described.

Figure 6:
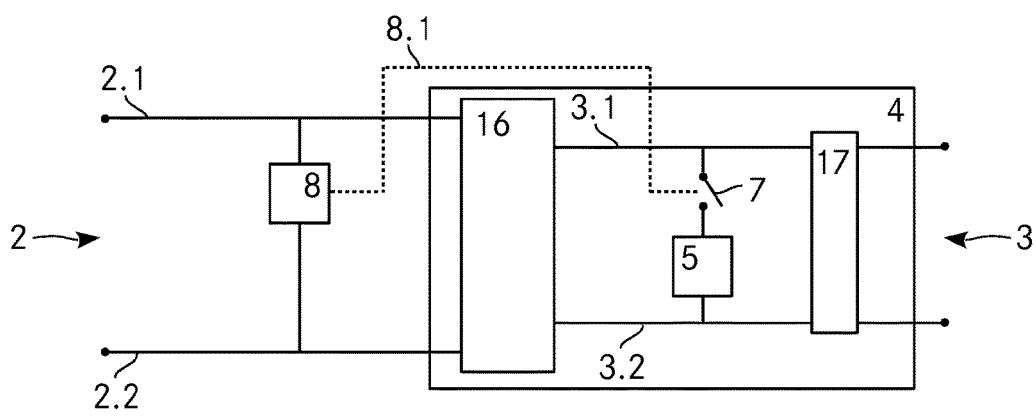
FIG. 6 a schematic illustration of another power supply according to the invention where the SPD is arranged at the output and where the voltage detection device is arranged at the input of the power supply.

FIG. 6 shows another configuration where the control unit 8 is connected upstream of the rectifier 16 but where the serial circuit of the SPD 5 and the switch 7 is connected downstream of the rectifier 16. I. e. the control unit 8 is connected between the two input conductors 2.1 and 2.2 and the serial circuit of the SPD 5 and the switch 7 is connected between the two output conductors 3.1 and 3.2. Again, the control output of the control unit 8 is fed to the control input of the switch 7 by the control line 8.1.

Figure 7:
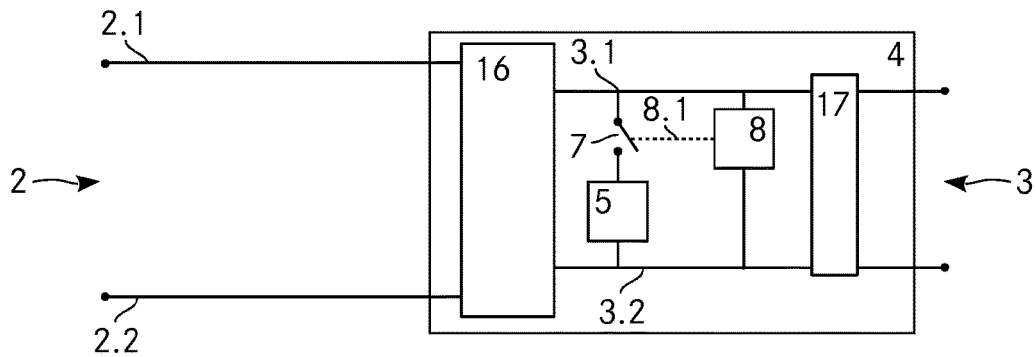
FIG. 7 a schematic illustration of another power supply according to the invention, where the SPD and the voltage detection device are arranged behind the bridge rectifier.

FIG. 7 shows a further configuration where both the control unit 8 and the serial circuit of the SPD 5 and the switch 7 are connected downstream of the rectifier 16 between the two input conductors 2.1 and 2.2. Again, the control output of the control unit 8 is fed to the control input of the switch 7 by the control line 8.1.

Figure 8:
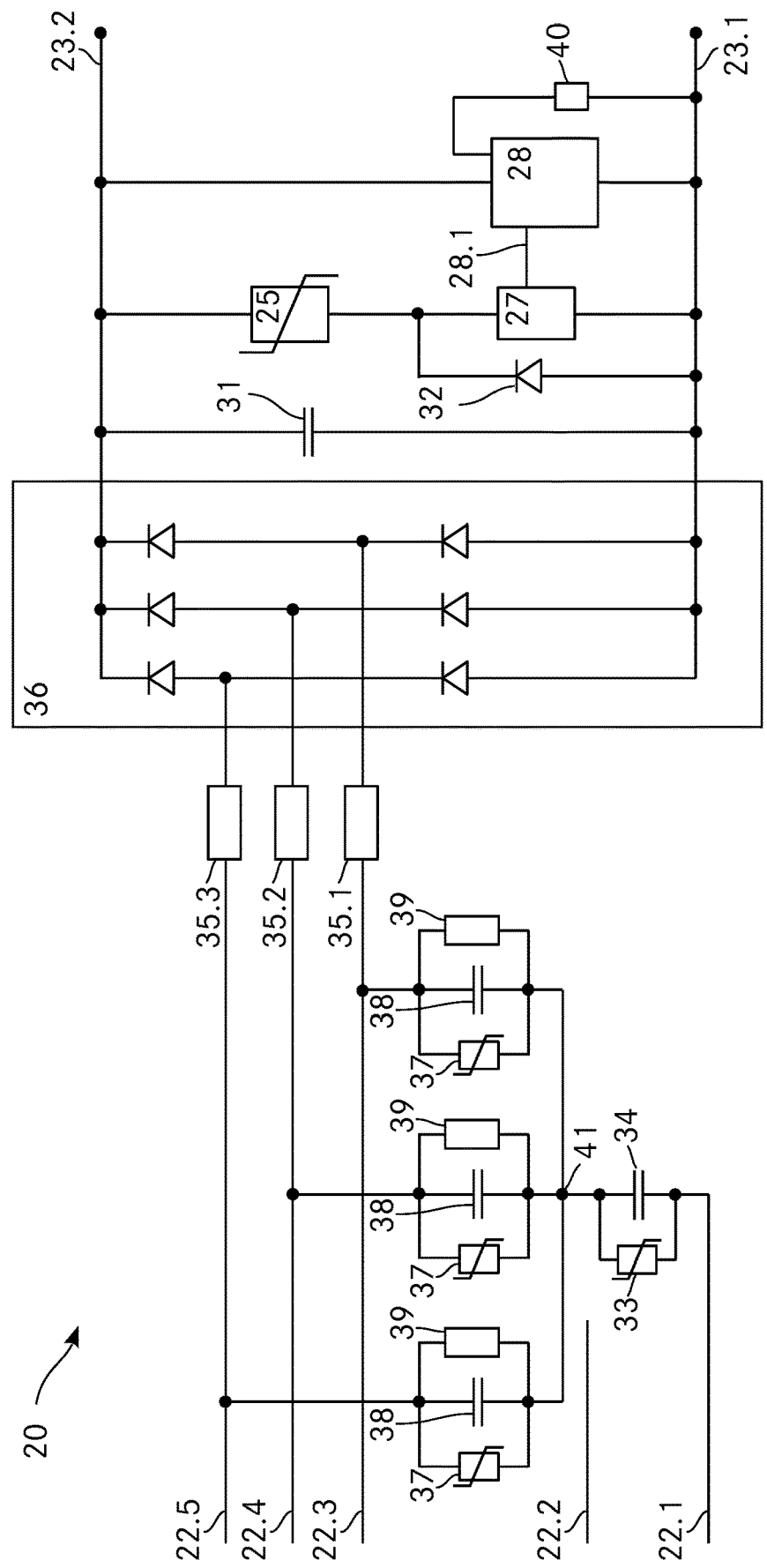
FIG. 8 a schematic illustration of an AC/DC power supply according to the invention and FIG. 9 a schematic illustration of another example to determine the comparison voltage to be compared with the threshold.

FIG. 8 shows a further example of an AC/DC power supply 20 according to the invention. The power supply 20 is fed by a three phase power grid (not shown) with three phase lines, an optional neutral line and a protective earth line. Accordingly, the power supply 20 includes a protective conductor 22.1, a neutral conductor 22.2 and three phase conductors 22.3, 22.4, 22.5. With a full bridge rectifier 36 including six diodes, the three phase AC input voltage is converted to a DC output voltage that is provided between a low conductor 23.1 and a high conductor 23.2. Further, a smoothing capacitor 31 is connected across the rectifier output between the two output conductors 23.1, 23.2. A serial circuit of an SPD and a switch is connected between the low and the high conductor 23.1, 23.2. In this case an MOV 25 is chosen as the SPD and an IGBT is used as the switch 27. The control unit 28 is also connected between the two output conductors 23.1, 23.2 and a small DC source 40 supplies the control unit 28 with energy. The DC source 40 may for example be a battery or a capacitor that is loaded by the power supply itself during normal operation or due to an input voltage rise at start up.

The control unit 28 determines the comparison voltage by measuring the voltage between the high and the low conductor 23.2, 23.1. The control unit 28 includes a comparator that compares the measured comparison voltage with a threshold voltage that is either generated by the control unit itself or that is generated somewhere else and fed to the control unit. In the example shown in FIG. 8 the threshold voltage is generated internally of the control unit 28. During normal operation, i. e. as long as the comparison voltage is lower than the threshold voltage, the control unit 8 generates a control signal that is provided to the switch 27 via control line 28.1 to keep the switch 27 switched off. In the case of a surge pulse, the voltage between the two output conductors 23.1, 23.2 rises and as soon as the comparison voltage determined by the control unit 8 is higher than the threshold voltage, the control unit 8 generates a drive signal to switch the switch 27 on. When the surge pulse is over, i. e. when the comparison voltage again falls below the threshold voltage, the control unit 8 switches the switch 27 off. In another example, the control unit 8 switches the switch 27 off only after a predetermined amount of time has lapsed either since the switching on of the switch 27 or since the comparison voltage has fallen below the threshold voltage.

At the input of the power supply 20 an inductivity 35.1, 35.2, 35.3 is provided in each of the phase conductors 22.3, 22.4, 22.5. In the example shown in FIG. 8, these inductivities 35.1, 35.2, 35.3 are discrete elements arranged in each of the phase conductors 22.3, 22.4, 22.5. In another embodiment, the inductivities 35.1, 35.2, 35.3 may also be stray or leakage inductances of other inductive elements present in the circuit. In the case of a surge the resulting surge current that flows through the MOV 25 after the closing of the switch 27 also flows through at least one of these inductivities 35.1, 35.2, 35.3. This limits the surge current at the beginning of the surge pulse, provided that the inductivities are suitably dimensioned. The inductivities 35.1, 35.2, 35.3 may either be independent inductors or they may be coupled.

Further, a diode 32 is connected in parallel to the switch 27. Its anode is connected to the low conductor 23.1 and its cathode is connected to the common terminal of the switch 27 and the MOV 25. The diode 32 enables a current flow through the MOV 25 from the low conductor 23.1 to the high conductor 23.2 in case the output voltage of the rectifier 36 becomes negative.

In order to even better protect the power supply 20 and the loads connected to it, the power supply 20 includes additional SPDs at the input. In particular a parallel circuit including an MOV 37, a capacitor 38 and a resistor 39 is connected from a star point 41 to each of the phase conductors 22.3, 22.4, 22.5. And another parallel circuit including a MOV 33 and a capacitor 34 is connected from the star point 41 to the protective earth conductor 23.1.

In a particular implementation, the elements shown in FIG. 8 may for example have the values or are implemented as follows:

| | |
|---|---|
| nominal grid voltage (neutral to phase rms) | 100 Vac-300 Vac (Volts) |
| nominal output voltage of rectifier 36 | 500 $V_{peak}$-710 $V_{peak}$ (Volts) |
| maximal nominal voltage of the load | 710 V-1000 V (Volts) |
| MOV 25 (clamp voltage) | about 900 V (Volts) at 350 A (Ampère) |
| switch 27 | IGBT |
| capacitor 31 | 1 µF (micro Farad) |
| MOV 33 (clamp voltage) | 1.5 V (may be a GDT or a surge arrestor) |
| capacitor 34 | 4.7 nF (nano Farad; Y-Cap) |
| inductivities 35.1, 35.2, 35.3 | 30 µH (micro Henry) |
| MOV 37 (clamp voltage) | about 900 V (Volts) at 50 A (Ampère) |
| capacitor 38 | 220 nF (nano Farad; X-Caps) |
| resistor 39 | 100 kOhm (kilo Ohm) |
| DC source 40 | 15 V (Volts) |

If a surge voltage of for example 2 kV peak is applied between the phase conductors 22.4 and 22.5, the voltage between these two phase conductors 22.4, 22.5 is limited to about 1.8 kV but the voltage across the serial circuit of the MOV 25 and the switch 27 is effectively limited to about 930 V peak.

Figure 9:
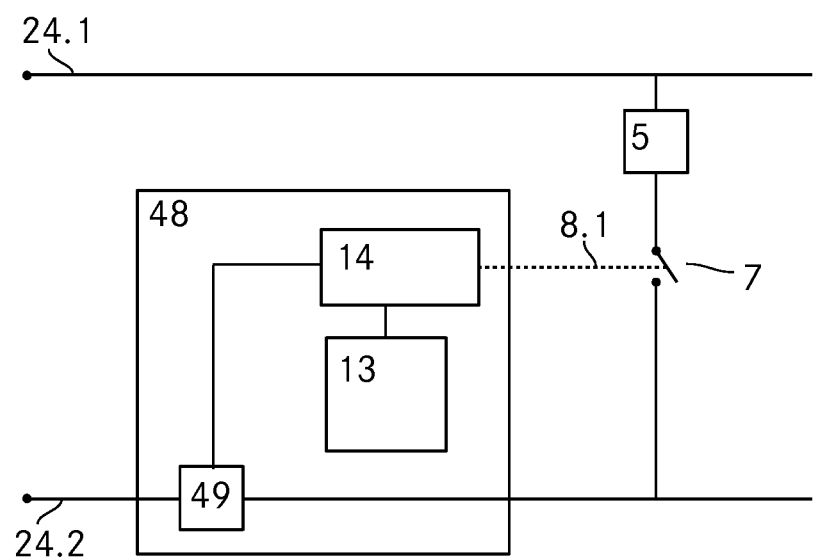

FIG. 9 shows another embodiment of a control unit 48. The control unit 48 determines the comparison voltage by determining the rate of change of the current flowing in one of the input conductors 24.1, 24.2. As known, the instantaneous voltage $U_L$ across an inductor L is the product of its inductance L and the instantaneous rate change di/dt of the current flowing through the inductor. In this example, the control unit 48 determines the rate of current change di/dt and then determines the comparison voltage by multiplying it with the inductance L. Then, as already described in connection with FIG. 3, the comparison voltage is compared by the switch control 14 to a threshold that is generated by the threshold generator 13. And based on this comparison, the switch control 14 generates the control signal that is outputted to the switch 7 via the control line 8.1.

Whereas in most drawings the power supply is shown to be a device separate from the load, the power supply may also be integrated into the load. Of course, the power supplies shown in the drawings and described above may, additionally to the elements shown, also include other elements and components not shown in the drawings such as for example controllers, regulators, filters, safety circuits, power factor correction (PFC) circuits and the like. The power supply and/or the device connected to it may also be further protected against overcurrents such as for example by contactors, fuses or the like.

In summary, it is to be noted that the invention enables providing a power supply that effectively protects itself and other devices connected thereto against surges. Thereby it is possible to choose the surge protection device with much more variance because its clamp voltage is no longer to be chosen according to the maximal nominal voltage of the downstream circuit.

The invention claimed is:

1. A Power supply for feeding a device with an electrical power, including a surge voltage protection arrangement with a surge protection device connected between two current conductors of the power supply, wherein the surge voltage protection arrangement further includes a device for determining a comparison voltage, a controllable switch connected in series with the surge protection device and a switch control having a comparison device for performing a comparison of the comparison voltage with a threshold where the switch control is adapted to control a switching of the switch in dependency of a result of the comparison such that the switch is switched on if the comparison voltage is higher than the threshold, wherein the device for determining the comparison voltage includes a detection unit for detecting a rate of change of a current flowing in at least one of the current conductors and where the detection unit is adapted to determine the comparison voltage based on the detected rate of change.

2. The power supply according to claim 1, where the surge protection device is chosen such that an effective clamping voltage of the surge protection device is lower than a maximal nominal operating voltage of the device.

3. The power supply according to claim 1, where the device for determining the comparison voltage includes a voltage detection device that is adapted to determine a voltage between the two current conductors as the comparison voltage.

4. The power supply according to claim 1, where the switch control is adapted to switch the switch off if at least one of the following conditions is fulfilled:
   a) a predetermined amount of time has lapsed since switching on of the switch,
   b) the comparison voltage is no longer above the threshold,
   c) a predetermined amount of time has lapsed since the comparison voltage is no longer above the threshold.

5. The power supply according to claim 1, where the power supply has an AC input.

6. The power supply according to claim 5, where one of the current conductors is a phase conductor of the power supply and the other conductor is a phase conductor or a neutral conductor of the power supply.

7. The power supply according to claim 5, including a rectifier, particularly a bridge rectifier, where the series circuit of the surge protection device and the switch is connected between two output conductors of the rectifier and where a capacitor is preferably connected across an output of the rectifier.

8. The power supply according to claim 7, where the series circuit of the surge protection device and the switch is connected directly behind the rectifier.

9. The power supply according to claim 7, where the surge voltage protection arrangement includes an inductivity arranged in one of the current conductors and connected in series with the surge protection device for limiting a current flow through the surge protection device, particularly a current flow at a beginning of a surge voltage.

10. The power supply according to claim 9, where the inductivity is connected upstream of the rectifier.

11. The power supply according to claim 1, where the switch includes an electrically controllable switch.

12. The power supply according to claim 11, where the switch includes an IGBT and where an emitter of the IGBT is connected to a first one of the output conductors, the surge protection device is connected between a second one of the output conductors and a collector of the IGBT, and where a control output of the switch control is connected to a gate of the IGBT.

13. The power supply according to claim 1, where the power supply is a three phase power supply, where an inductivity is arranged in each of the three phase conductors of the power supply.

14. An electrically operable device including a power supply according to claim 1.

15. A method for protecting a power supply for feeding a device with an electrical power against a surge voltage, including the step of
 a) connecting a surge protection device between two current conductors of the power supply,
 b) connecting a controllable switch in series with the surge protection device,
 c) determining a comparison voltage with a voltage detection device by
  detecting a rate of change of a current flowing in at least one of the current conductors with a detection unit, and
  determining the comparison voltage based on the detected rate of change,
 d) comparing the comparison voltage with a threshold, and
 e) switching the switch on if the comparison voltage is higher than the threshold.

16. A power supply for feeding a device with an electrical power, including a surge voltage protection arrangement with a surge protection device connected between two current conductors of the power supply, wherein the surge voltage protection arrangement further includes a device for determining a comparison voltage, a controllable switch connected in series with the surge protection device and a switch control having a comparison device for performing a comparison of the comparison voltage with a threshold where the switch control is adapted to control a switching of the switch in dependency of a result of the comparison such that the switch is switched on if the comparison voltage is higher than the threshold, wherein the device for determining the comparison voltage includes a detection unit for detecting a rate of change of a current flowing in at least one of the current conductors and where the detection unit is adapted to determine the comparison voltage based on the detected rate of change and wherein the detection unit is adapted to determine the comparison voltage as being proportional to the detected rate of change.

17. A method for protecting a power supply for feeding a device with an electrical power against a surge voltage, including the step of
 f) connecting a surge protection device between two current conductors of the power supply,
 g) connecting a controllable switch in series with the surge protection device,
 h) determining a comparison voltage with a voltage detection device by
  detecting a rate of change of a current flowing in at least one of the current conductors with a detection unit and
  determining the comparison voltage based on the detected rate of change as being proportional to the detected rate of change,
 i) comparing the comparison voltage with a threshold, and
 j) switching the switch on if the comparison voltage is higher than the threshold.

* * * * *